Figures 1, 2:
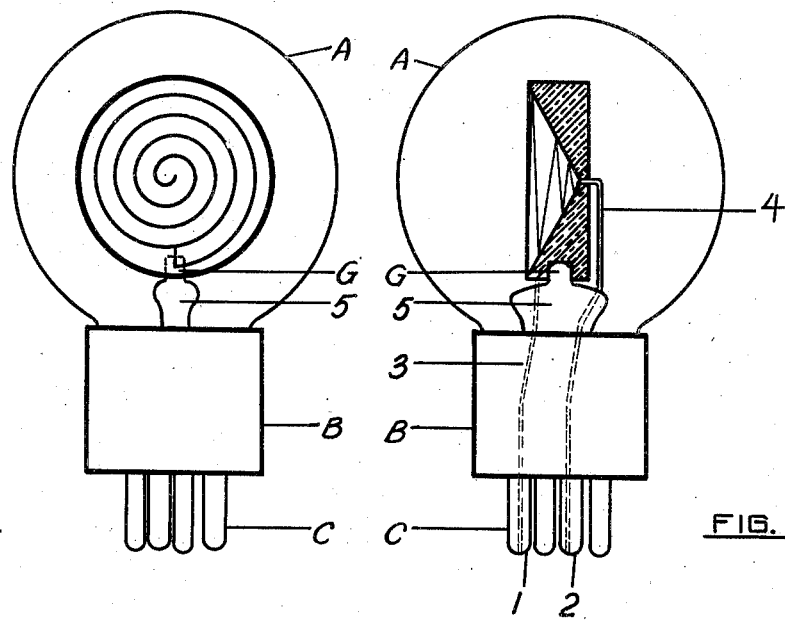

April 17, 1934.  T. H. NAKKEN  1,955,084
SOLID SURFACE AREA ILLUMINATOR
Filed May 27, 1930  2 Sheets-Sheet 1

INVENTOR
THEODORUS H. NAKKEN
BY
ATTORNEY

April 17, 1934.      T. H. NAKKEN      1,955,084
SOLID SURFACE AREA ILLUMINATOR
Filed May 27, 1930      2 Sheets-Sheet 2
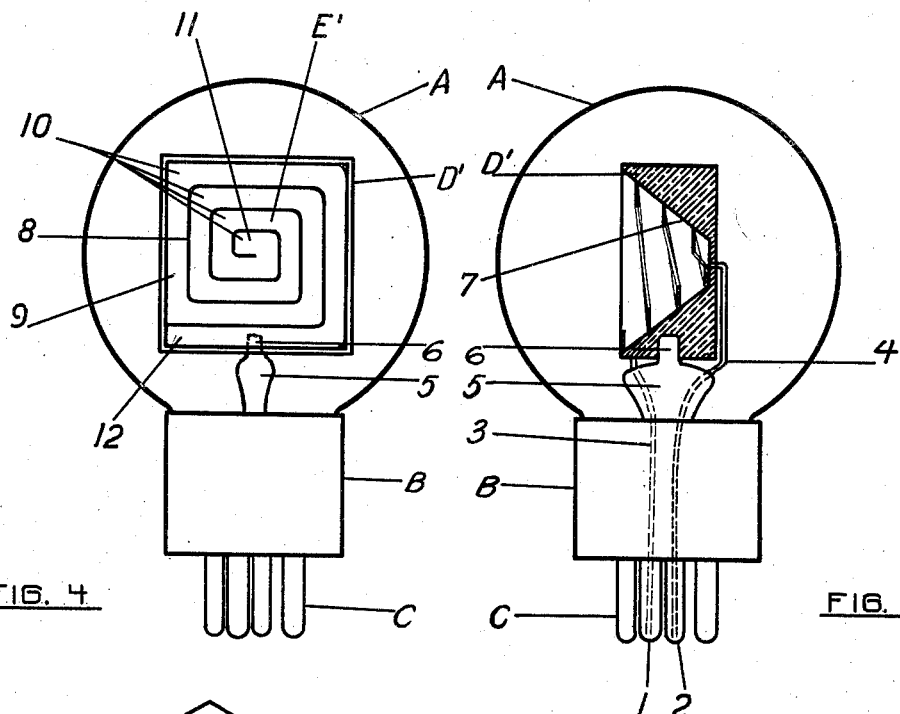
FIG. 4
FIG. 5
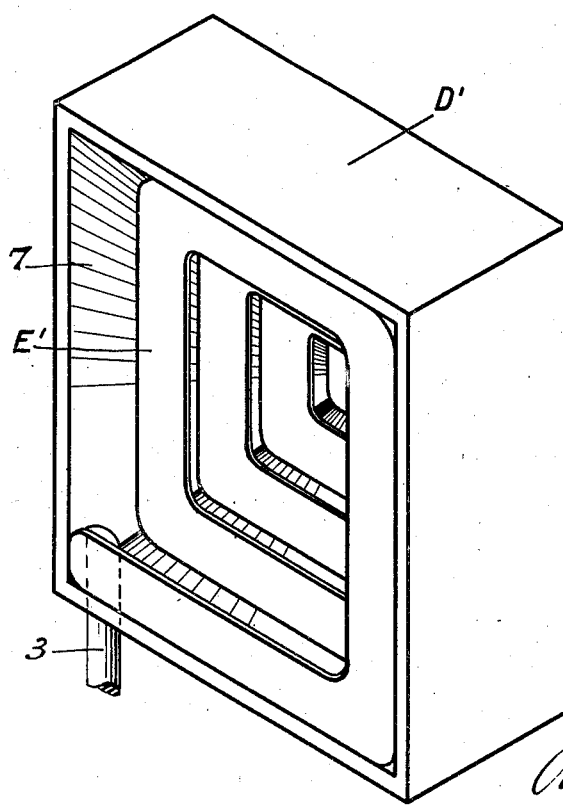
FIG. 6
INVENTOR
THEODORUS H. NAKKEN
BY
ATTORNEY Patented Apr. 17, 1934

1,955,084

UNITED STATES PATENT OFFICE 1,955,084

SOLID SURFACE AREA ILLUMINATOR

Theodorus H. Nakken, New York, N. Y., assignor to Nakken Patents Corporation, a corporation of Delaware Application May 27, 1930, Serial No. 456,059

5 Claims. (Cl. 176—40)

This invention relates to projection lamps. In the art of motion pictures it is an object to provide a beam of light co-extensive with the frame or picture to be projected on the screen which is above the necessary minimum light value per unit of area of the frame. If the primary source of light generating this beam is smaller than the area of the frame, it is necessary, in accordance with the law of optics, that the intensity of the light passing through the frame be less than the intensity of the light at the source. It is also a self-evident fact that if the shape of the primary source of light is different from, that is, non-similar to, the shape of the frame, that a part of the enlarged projected image of the primary source of light which extends outside of the confines of the frame is useless for projection purposes. In accordance with the present invention, it is proposed to employ as a primary source of light an incandescing surface, a configuration of which is similar to that of the frame to be projected. This primary source of light may, of course, be smaller than, equal to, or larger than the size of the frame to be projected and optical means may be employed to vary the cross-sectional area of the beam as it crosses through the frame.

An object of the present invention is to provide such a primary source of light as will have a substantially uniform degree of light intensity throughout its entire surface and be an unbroken surface area of light of similar configuration to the frame to be projected. While attaining this object, it is a further object to do so by the use of means readily adapted to respond to the usual method of transforming electric energy into light such as the resistance heating of an incandescable member.

In carrying out the object of the invention, it is proposed to provide an unbroken surface of illumination when viewed from the projecting face of the lamp and which has the configuration desired but which itself is broken up into an extensive path for the flow of electricity. To this end it is proposed to employ a helical spiral, the projection of which in the direction of projection presents an unbroken uniformly illuminated surface, but the conductive path through which is isolated by spacing convolutions of the light emitting member at right angles to the general surface of illumination in sufficient amount to prevent electrical contact between the convolutions.

A further object of the invention is to improve in general the efficiency, durability and general character of a projection lamp.

The above will be pointed out more particularly in the following claims which are directed to illustrative embodiments of the invention described in the following specification in connection with the accompanying drawings solely for purposes of illustration and not limitation.

Figure 3:
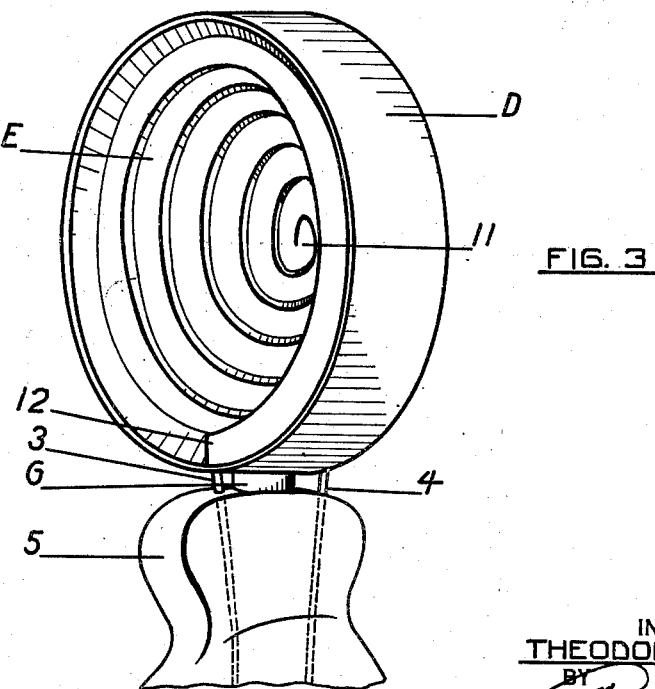

In the drawings, Fig. 1 is a front view of one embodiment of the invention in a completed incandescent projection lamp; Fig. 2 is a side view thereof partly in central vertical cross-section; Fig. 3 is a perspective view drawn to an enlarged scale of the light element with its supporting box; Fig. 4 is a view similar to Fig. 1 showing a modification of the invention; Fig. 5 is a side elevation partly in vertical cross-section of the structure shown in Fig. 4; and Fig. 6 is a perspective view of the light element with its supporting box of the structure shown in Figs. 4 and 5.

In all the figures, A indicates any approved form of enclosing bulb such as a glass bulb adapted to be evacuated and mounted on any approved base B shown here as of the vacuum tube type provided with prongs C, only 1 and 2 of which need to be employed for the exciting circuit, but all of which are useful in determining a single possible position for the mounting of the lamp in the usual form of vacuum tube socket. From the prongs 1 and 2 lead-in wires 3 and 4 extend into the evacuated chamber within the bulb A through the supporting stem 5 and may be sealed in in accordance with approved practice. It is, of course, to be understood that the atmosphere within the bulb A may be a substantial vacuum or low pressure gas in accordance with any approved practice. Within the bulb A is provided a box-like support D or D' suitably mounted upon the stem 5 as by means of the boss 6. This box D and D' should be constructed of insulating heat resisting material such as lava. It is provided with a supporting pocket 7 of dished frusto-conical or frusto-pyramidal shape. Within this pocket is crushed a plate E or E' of thin sheet tungsten or any suitable incandescable resistance material capable of functioning in response to the passage therethrough of an exciting electric current. This sheet is severed by means of a helical cleavage 8 into the form of a helical ribbon 9 which by crushing into the pocket 7 is transformed into a helical spiral. Each nethermost convolution may be caused slightly to overlap the outer convolution or to correspond in forward projection edge to edge with a forward convolution. Stated differently, when the sheet is formed into a helical ribbon by means of the helical cleavage 8, it is preferably not merely dished but slightly closed together towards the axis of the helix so that, when incandescent, a solid light surface is presented, although the heating current traverses a helix. In the case of the circular configuration shown in Figs. 1 to 3 inclusive, the helical cleavage readily forms convolutions of substantially uniform resistance or conductivity. When a rectangular configuration is employed, such as that shown in Figs. 4 to 6 inclusive, it is contemplated that the convolutions at the corners such as 10 may be reduced in thickness so as to provide uniform conductivity throughout the entire extent of all the convolutions.

The terminal end 11 at the center is suitably welded or otherwise connected with the lead-in wire 4 extending through the supporting box, and the outer terminal 12 of the convolutions is similarly welded to the lead-in wire 3. Although the supporting box is shown of a form contacting with the outer edges of the convolutions, it is to be understood that a pocket 7 may be formed with a helically spiral ledge contacting with both the outer edge of each convolution and the rear face of each convolution.

In constructing the incandescent element, it is to be understood that it is from the view of Figs. 1 and 4 that the structure presents an unbroken substantially uniform intensity light image of the desired configuration and area so that this light image may be projected through the frame of a picture film without loss of the light generated occasioned by any necessary overlap.

What I claim and desire to secure by United States Letters Patent is:

1. Means for producing a luminous area of predeterminable extent and configuration comprising a helically cut sheet metal piece providing an electrically conductive medium of substantial linear extent and of substantially uniform cross-sectional area with regard to electric conductivity, said medium being disposed in the form of optically closed edge to edge convolutions out of contact one with another, capable of incandescing upon the passing therethrough of electricity to form a light area of unbroken surface extent coextensive with said convolutions.

2. A sheet tungsten incandescable light element comprising a convolute band extending helically and spirally from the center outward to the periphery and presenting in surface projection an unbroken surface area for purposes of illumination but for purposes of electric resistance heating presenting a long band of substantially uniform cross-section, and insulating means for mounting and holding said convolute band in the operable position and shape specified.

3. In an incandescent lamp, a heat resisting insulating support having walls forming a dished supporting cavity; a convolute ribbon of tungsten mounted in said dished cavity and forming a path of substantially uniform conductivity from its center to its periphery and presenting an overlapping surface area for illumination outwards from said cavity.

4. An incandescable element for lamps comprising a helical spiral of incandescable electrically conductive sheet metal of substantially uniform electric conductivity throughout its extent and with the convolutions of said helical spiral forming a contiguous edge to contiguous edge closed surface exposed outwardly substantially in the direction of the axis of said helical spiral.

5. A projection lamp comprising an enclosing bulb provided with lead-in wires; a heat resisting insulating box providing a dished supporting pocket; means for supporting said box within said bulb; an incandescable resistance element in the form of a helical spiral supported by said box in said dished pocket with its convolutions spaced apart in the direction of the axis but closed radially outward therefrom.

THEODORUS H. NAKKEN.